United States Patent
Schaefer

(10) Patent No.: US 10,425,125 B2
(45) Date of Patent: Sep. 24, 2019

(54) TEST ARRANGEMENT, DEVICE AND METHOD FOR MEASURING A DIRECTED SIGNAL

(71) Applicant: Rohde & Schwarz GmbH & Co. KG, München (DE)

(72) Inventor: Andrew Schaefer, Oberhaching (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 25 days.

(21) Appl. No.: 15/887,226

(22) Filed: Feb. 2, 2018

(65) Prior Publication Data
US 2019/0190566 A1    Jun. 20, 2019

(30) Foreign Application Priority Data
Dec. 18, 2017   (EP) .................... 17208102

(51) Int. Cl.
*H04B 3/46* (2015.01)
*H04L 12/26* (2006.01)
*H04L 5/14* (2006.01)

(52) U.S. Cl.
CPC ............. *H04B 3/46* (2013.01); *H04L 5/14* (2013.01); *H04L 43/12* (2013.01); *H04L 43/50* (2013.01)

(58) Field of Classification Search
CPC ...... H04B 3/46; H04B 17/00; H04B 17/0085; H04B 17/21; H04B 17/29
See application file for complete search history.

(56) References Cited

U.S. PATENT DOCUMENTS

| 5,425,052 A | 6/1995 | Webster et al. |
|---|---|---|
| 5,610,596 A * | 3/1997 | Petitclerc ............... G21C 17/00 340/10.51 |
| 2005/0159914 A1* | 7/2005 | Sunden ................. H04J 3/1605 702/125 |
| 2007/0140473 A1* | 6/2007 | Ishibe ................... H04L 5/1423 379/394 |
| 2008/0319693 A1 | 12/2008 | Spirkl et al. |

OTHER PUBLICATIONS

Extended European Search Report for European Patent Application No. 17208102.8, dated Jun. 5, 2018, 7 pages.

* cited by examiner

*Primary Examiner* — Shuwang Liu
*Assistant Examiner* — Gina M McKie
(74) *Attorney, Agent, or Firm* — Westman, Champlin & Koehler, P.A.

(57) ABSTRACT

The present invention provides to an estimation of a directed signal on a bidirectional duplex transmission line without the need of a directional coupler which has to be physically inserted into the wired transmission line. It is for this purpose, that the signals on the transmission line are measured at two separate spatial positions and the directed signals on the wired transmission line are estimated by analyzing the measured signals.

15 Claims, 2 Drawing Sheets

TEST ARRANGEMENT, DEVICE AND METHOD FOR MEASURING A DIRECTED SIGNAL

TECHNICAL FIELD

The present invention relates to a test arrangement. The present invention further relates to a device and a method for measuring a directed signal.

BACKGROUND

Although applicable in principle in and for any wired test system, the present invention and its underlying problem will be hereinafter described in combination with measuring signals on a bidirectional transmission line between two transceivers.

Transceivers may be connected by a bidirectional transmission line. In such a case, a first transceiver may transmit a first signal to a second transceiver via a wired transmission line. The same wired transmission line may be also used for transmitting signals from the second transceiver to the first transceiver. In case someone wishes to extract a signal which is transmitted from the first transceiver to the second transceiver, or alternatively a signal which is transmitted from the second transceiver to the first transceiver, a directional coupler has to be physically inserted into the wired transmission channel between the first and the second transceiver. Such a directional coupler allows to extract only signals which pass through the coupler in a first direction, while signals passing through the coupler in another direction are not extracted.

However, directional couplers are expensive and require a physical modification of the wired transmission line between the first and the second transceiver.

SUMMARY

Against this background, there is a need to extract directed signals on a bidirectional or duplex transmission line. In particular, there is a need to provide a simple extraction of directed signals requiring minimal impact on the transmission line.

For this purpose, the present invention provides a device for measuring a directed signal having the features of claim 1, a test arrangement having the features of claim 10 and a method for measuring a directed signal having the features of claim 11.

Accordingly, it is provided:

A device for measuring a directed signal on a bidirectional transmission line. The device comprises a first probe, a second probe and a signal processor. The first probe is adapted to measure a first measurement signal at a first position on the transmission line. The second probe is adapted to measure a second measurement signal at a second position on the transmission line. The signal processor is adapted to determine a delayed second measurement signal based on a distance between the first position and the second position on the transmission line. The signal processor is further adapted to compute a forward directed signal on the transmission line using a difference between the first measurement signal and the delayed second measurement signal.

A test arrangement comprising a first transceiver, a second transceiver, a wired bidirectional transmission line and a device for measuring a directed signal according to the present invention. The first transceiver is adapted to transmit a first signal and to receive a second signal. The second transceiver is adapted to transmit the second signal and to receive the first signal. The wired transmission line is adapted to communicatively couple the first transceiver and the second transceiver.

A method for measuring a directed signal on a bidirectional transmission line. The method comprises the steps of measuring a first measurement signal at a first position on the transmission line and measuring a second measurement signal at a second position on the transmission line. The method comprises further a step for determining a delayed second measurement signal based on a distance between the first position and the second position on the transmission line, and a step of computing a forward directed signal on the transmission line using a difference between the first measurement signal and the delayed second measurement signal.

The present invention is based on the fact that a bidirectional or duplex transmission line may be used for simultaneously transmitting signals in two opposite directions. As explained above, some applications, in particular some tests may require extracting only signals in one direction, or separating the signals depending on the direction when performing a measurement on the transmission line.

Accordingly, it is an idea of the present invention to provide a smart and efficient method for separating the signals on a bidirectional transmission line depending on the transmission direction. It is for this purpose, that the signals on a transmission line are measured at a number of at least two positions on the transmission line. By analyzing these measurements and further taking into account the temporal delay caused by the propagation speed of the signals on the transmission line, it is possible to separate the signals on a transmission line with respect to the propagation direction.

The analysis of the signals on the transmission line by comparing the signals measured at two spatial separated positions on the transmission line allows separating the signals on the transmission line depending on the propagation direction. In this way, it is possible to extract only signals having a desired propagation direction or to differentiate between the signals having different propagation directions without the need of complex directional couplers. Hence, it is not necessary to physically manipulate the transmission line in order to insert hardware of a directional coupler. Accordingly, the transmission properties of the duplex transmission line can be maintained. Further, the costs for measuring the signals depending on the propagation direction can be reduced.

The probes for measuring the signals on the transmission line may be any kind of probes which are appropriate for measuring the respective signals. For example, the probes may measure a voltage at the respective position of the transmission line. For this purpose, it may be possible that the probes may measure the voltage at the respective position and provide digital data corresponding to the measured voltage. For this purpose, the probe may comprise appropriate hardware elements such as analogue to digital converters, amplifiers etc. Alternatively, the probe may also measure the voltage at the desired position at the transmission line and provide an analogue signal corresponding to the measured voltage. In this case, the analogue signal may be converted to a digital signal at another position during the further processing. However, it is understood that any other measuring of the signals at the respective positions, in particular any kind of measuring a voltage at the respective position may be also possible.

In order to separate the signals transmitted on the duplex transmission line or to extract a signal transmitted in a predetermined direction through the transmission line, the measured signals may be compared with each other. In particular, one of the signals may be delayed with respect to the other signal and subsequently, the delayed signal may be compared with the undelayed signal in order to compute the components of the signals having a desired propagation direction. For instance, a delayed measured second signal may be subtracted from an undelayed measured first signal. Based on this difference between the delayed and the undelayed signal, the components of the signal on the transmission line in a desired direction may be computed. For example, an appropriate reconstruction filter may be applied to the difference between the signals in order to extract the desired signal components.

In order to determine a delayed signal, the respective signal may be temporary stored in a memory. Accordingly, the desired delayed signal may be read out from this memory at a later point of time. For example, the measured signals may be converted to digital data and the respective digital data may be subsequently stored. In particular, it may be possible to sample the digital data with a predetermined sampling rate. However, it is understood, that any other scheme for sampling and converting the measured signal to digital data may be also possible. Furthermore, it may be possible that an appropriate time stamp may be also associated and stored with the sampled measurement data.

The signal processor may comprise, for instance, a general purpose processor with corresponding instructions. Further, the signal processor may comprise interfacing elements that are coupled to the processor, who receive the measured signals from the probes and provide the received signals to the processor. If appropriate, the processor may also receive digital measurement data from a memory storing the measurement data corresponding to the measurement signals. Interfacing elements may comprise, for example, analogue to digital converters that convert the measured signals into digital data for a further processing by the processor. Such dedicated digital to analogue converters may be, for example coupled to the processor via a serial or parallel digital interface. Between the digital to analogue converters and an input port further elements like filters, resistors, capacitors and inductors or the like may be provided. The signal processor may comprise hardware elements, for instance a processing unit. However, the signal processor may be also software implemented at least in part. For example, the signal processor may comprise instructions that cause the signal processor to perform computation of the desired signals based on the measurement data. The extractions may therefore be stored in a memory that is coupled to a general purpose processor, for example via a memory bus. The processor may further execute an operating system that loads and executes the instructions. The processor may be, for example, an Intel processor that runs an operating system and executes the instructions. Alternatively, the processor may be a processor of a measurement device that may run an embedded operating system for loading and executing the instructions.

Further embodiments of the present invention are subject of the further sub-claims and of the following description, referring to the drawings.

In a possible embodiment, the signal processor is adapted to delay the first measurement signal based on the distance between the first position and the second position on the transmission line. The signal processor may be further adapted to compute a backward directed signal on the transmission line using a difference between the second measurement signal and the delayed first measurement signal.

The expressions "forward directed signal" and "backward directed signal" denote the two opposite directions for transmitting signals through the transmission line. However, it is understood that neither forward nor backward on its own may limit the scope of the present invention. By computing a first signal relating to a first propagation direction on the transmission line and a second signal referring to a second propagation direction opposite to the first propagation direction, it is possible to estimate the signals referring to both opposite propagation directions. In particular, the signals on the transmission line may be separated depending on the propagation direction. In particular, the separation of the signals depending on a propagation direction can be achieved simply by measuring at two spatial separated positions on the transmission line. Accordingly, no additional hardware such as a directional coupler is required.

In a possible embodiment, the signal processor is adapted to determine a time period for delaying the second measurement signal based on a spatial distance between the first position and the second position on the transmission line.

By taking into account the spatial positions of the first probe and the second probe on a transmission line and in particular by taking into account the length of the transmission line between these probes, it is possible to calculate to propagation time of a signal on the transmission line between the first probe and the second probe. In particular, the propagation time of a signal between the first probe and the second probe may be calculated based on the special distance between the first and the second probe and the physical properties of the transmission line, in particular based on the relative propagation time of a signal on the transmission line. Accordingly, the delay time for determining the delay of the signals may be determined based on the propagation time of a signal on the transmission line between the first and the second probe.

In a possible embodiment, signal processor is adapted to compute a propagation delay of a signal between the first position and the second position on the transmission line. Accordingly, a time period for delaying the first measurement signal and/or the second measurement signal may be determined based on the computed propagation delay.

For computing the propagation delay of a signal between the first probe and the second probe, any appropriate computation scheme may be possible. For example, it may be possible to refer to the spatial distance and the relative propagation speed of the transmission line as already described above. However, it may be also possible to analyze the signal characteristics of the measured signals in order to determine the time period of a propagation delay between the first probe and the second probe. For example, it may be possible to compute the delay based on a cross correlation between the measured first signal and the measured second signal. However, it is understood, that any other computation scheme for determining the propagation delay between the first probe and the second probe may be also possible.

In a possible embodiment, a spatial distance between the first position of the first probe and the second position of the second probe on the transmission line may be set up based on the frequency and/or the bandwidth of the signals transmitted on the transmission line.

In a possible embodiment, the spatial distance between the first position of the first probe and the second position of the second probe on the transmission line may be set to achieve a measurement having a difference of at least the reciprocal value of 10 times the maximum frequency of the signal transmitted on the transmission line.

By taking into account that maximum frequency of the signal transmitted on the transmission line, it may be possible to set up the distance between the individual probes for measuring the signals in appropriate manner. In particular, by considering an appropriate minimum distance between the respective probes, it may be possible to obtain signals which can increase the reliability of the calculated signals. However, it is understood that by increasing the spatial distance between the individual probes for measuring the signal on the transmission line, the accuracy and reliability of the computed signal for the individual transmission directions can be increased.

In a possible embodiment, the test arrangement may comprise a number of one or more further probes. Each further probe may be adapted to measure a further measurement signal at a respective further position on the transmission line. Accordingly, the signal processor may be adapted to determine the forward directed signal and/or the backward directed signal on the transmission line using the first measurement signal, the second measurement signal and the further measurement signals.

By taking into account measured signals from more than two probes at different spatial positions on the transmission line, the accuracy of the computed signal for the individual transmission directions can be increased. The spatial distance between neighboring probes may be the same, i.e. equidistant. Alternatively, the spatial distance between neighboring probes may be different, respectively. In particular, it may be possible that a spatial distance between a third and a second probe may be significantly larger, i.e. at least 3, 4, 5 or 10 times than the distance between the first and the second probe. However, it is understood, that any other scheme for selecting the spatial positions of the probes on the transmission line may be also possible.

In a possible embodiment, the device may further comprise a signal recorder adapted to record the measured first signal and the measured second signal. The measured signals may be recorded with a predetermined sampling rate. Accordingly, the probes may already provide digital data of the measured signals and the signal recorder may record the provided digital data. Alternatively, the probes may provide analogue signals, and the analogue signals may be converted to digital data by the signal recorder before recording the data. The data may be recorded with a predetermined constant sampling rate. Accordingly, the temporal distance between two successively sampled measurements is always the same. However, it may be also possible to record a time stamp corresponding to the respective recorded data. The recording of the data may be performed, for example, in a cyclic manner. In this way, the data are recorded for a predetermined period of time and after this predetermined period of time, the respective data may be overwritten by newly acquired data.

By recording the measurement data, it is easily possible to access measurement data of a previous point of time. In this way, delayed data may be obtained by reading out the respective data from the signal recorder.

In a possible embodiment of the method for measuring a directed signal, the computing the forward directed signal on a transmission line comprises calculating a difference between the first measurement signal and the delayed second measurement signal and apply a reconstruction filtering to the computed difference. The reconstruction filtering may comprise, for example, any appropriate algorithm for computing the directed signal, in particular the forward directed signal, based on the difference between the measured first signal and the delayed measured second signal. For example, the computation may comprise transformation of the signals in a Z-domain.

In particular, the reconstruction of the directed signal, such as the forward directed signal on the transmission line may be based on the following explanation.

Assuming that a first transceiver is sending a first signal $x(t)$ and a second transceiver is sending a second signal $y(t)$, and further assuming that a propagation time from the first transceiver to the first probe is t1 and a propagation time from the second transceiver to the second probe is t2 and a propagation time of a signal from the first probe to the second probe is t3, the first probe may measure a signal $a(t)$ and the second probe may measure a signal $b(t)$ according to the following formulas:

$a(t)=x(t-t1)+y(t-t2-t3)$ $b(t)=x(t-t1-t3)+y(t-t2)$

Accordingly:

$a(t-t3)=x(t-t1-t3)+y(t-t2-2*t3)$ and further:

$b(t)-a(t-t3)=x(t-t1-t3)+y(t-t2)-x(t-t1-t3)-y(t-t2-2*t3)$

This can be simplified to difference $d(t)$ according to the following formula:

$$d(t) = b(t+t2) - a(t-t3+t2)$$
$$= y(t) - y(t-2*t3)$$

Hence, one signal has been eliminated while creating a differential signal of the other signal. Thus, y can be reconstructed by a reverse differentiation with a simple integration.

For example, the above formula can be transformed to the digital domain as:

$d(k)=y(k)-y(k-2*\Delta 3)$

By converting this to the z-domain:

$Y(z)=D(x)/(1-z^{\wedge}(2*\Delta 3))$

This corresponds to an integrator with an delay element of the length of $2*\Delta 3$.

In a possible embodiment, the delayed first measurement signal and/or the delayed second measurement signal are determined using a propagation delay of a signal between the first position of the first probe and the second position of the second probe on the transmission line.

Computing a cross correlation is a well-known mathematical approach. By using a cross correlation between the first measured signal and the second measured signal, the propagation delay between the first position of the first probe and the second position of the second probe can be easily determined. Accordingly, the propagation delay can be used as a basis for determining the delay of a signal when computing the forward directed signal or the backward directed signal.

In a possible embodiment, the method further comprises a step of measuring a third measurement signal at a third position on the transmission line and determining a first propagation delay of a signal on the transmission line between the first position and the third position on the transmission line. The method may further comprise the steps of determining a second propagation delay of the signal on the transmission line between the second position and the third position on the transmission line and computing a propagation delay of a signal between the first position and the second position on the transmission line using a difference between the determined first propagation delay and the determined second propagation delay.

In particular, the distance between the third probe and the second probe as well as the distance between the third probe and the first probe is much larger than the distance between the first probe and the second probe. For example, the distance between the third probe and the first probe or the second probe may be 2, 3, 5 or 10 times larger than the spatial distance between the first probe and the second probe. Accordingly, by referring to measured signals of a third probe having a large spatial distance to the first probe and the second probe, a reliable basis for determining a propagation delay of a signal between the first probe and the second probe can be obtained. In this way, the accuracy of the determined propagation delay can be enhanced. In particular, it may be possible to determine a propagation delay between the first probe and the third probe based on a cross correlation and to determine a propagation delay between the second probe and the third probe based on a cross correlation. Subsequently, the propagation delay between the first probe and the second probe can be determined by subtracting the propagation delay between the first probe and the third probe from the propagation delay between the second probe and the third probe.

With the measuring of directed signals according to the present invention, it is possible to obtain an estimation of the directed signals on a transmission line without the need of additional hardware such as a directional coupler. For example, a signal referring to a predetermined propagation direction on a transmission line can be computed. For example, a bidirectional transmission line may be used for coupling a first transceiver and a second transceiver. Accordingly, a single transmission line can be used for transmitting signal from the first transceiver to the second transceiver and transmitting signals from the second transceiver to the first transceiver. By analyzing the signals on the transmission line according to the present invention, it is possible to estimate information about signals referring to a particular direction on the transmission line. It is understood, that the present invention can determine the signal from the first transmitter to the second transmitter as well as the signals transmitted from the second transmitter to the first transmitter. In particular, it is possible to estimate both signals separately and to provide these signals for further analysis.

Where appropriate, the above-mentioned configurations and developments can be combined in any manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

BRIEF DESCRIPTION OF THE DRAWINGS

For a more complete understanding of the present invention and advantages thereof, reference is made to the following description taking in conjunction with the occupying drawings. The invention is explained in more detail below using exemplary embodiments which are specified in the schematic Fig.s of the drawings, in which.

Figure 1:
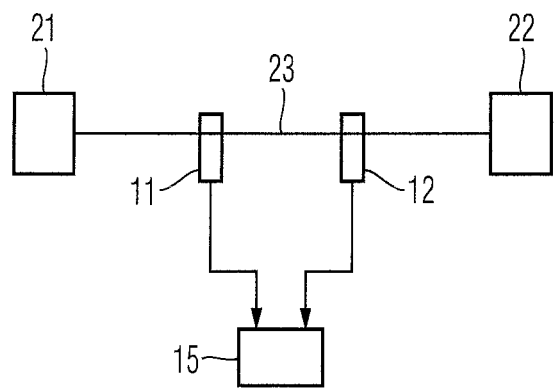
FIG. 1 shows a block diagram of an embodiment of a test arrangement according to the present invention.

The appended drawings are intended to provide further understanding of the embodiments of the invention. They illustrate embodiments and help to explain principles and concepts of the invention in conjunction with the description. Other embodiments and many of the advantages mentioned become apparent in view of the drawings. The elements in the drawings are not necessarily shown in scale.

In the drawings, similar, functional equivalents and identical operating elements, features and components are provided with same reference signs in each case, unless stated otherwise.

DETAILED DESCRIPTION OF THE DRAWINGS

FIG. 1 shows a block diagram of an embodiment of a test arrangement 100. The test arrangement 100 comprises a first transceiver 21, and a second transceiver 22. The first transceiver 21 and the second transceiver 22 are communicatively coupled with each other by a wired transmission line 23. The wired transmission line 23 may be any kind of wired transmission line, for instance a transmission line using copper cables such as coaxial cables or twisted pair cables. Furthermore, the transmission line may be also an optical transmission line or any other kind of a wired transmission line. Even though only a single wired transmission line 23 is illustrated in FIG. 1, it may be also possible that the first transceiver 21 and the second transceiver 22 may be coupled with each other by a plurality of transmission lines 23.

The test arrangement 100 may further comprise a first probe 11 and a second probe 12. The first probe 11 and the second probe 12 may be arranged at different spatial positions on the transmission line 23. For example, the first probe 11 may be located at a first spatial position, and the second probe 12 may be located at a second spatial position which is different from the first spatial position of the first probe. The first probe 11 may measure the signals transmitted through the wired communication line 23 at the first position, and the second probe 12 may measure the same signals which are transmitted through the transmission line 23 at the second position. For example, the first probe 11 and the second probe 12 may provide analogue signals to a signal processor 15. However, it may be also possible that the first probe 11 and the second probe 12 may comprise an analogue to digital converter and provide digital data corresponding to the respective signals at the first position and the second position. In this case, the digital data may be provided to the signal processor 15 for further processing.

Even though only two probes, namely a first probe 11 and a second probe 12 are illustrated in FIG. 1, the present invention is not limited to only two probes 11, 12. Furthermore, it may be also possible to use any number of two or more probes for measuring the signals at different spatial positions on the transmission line 23.

Figure 2:
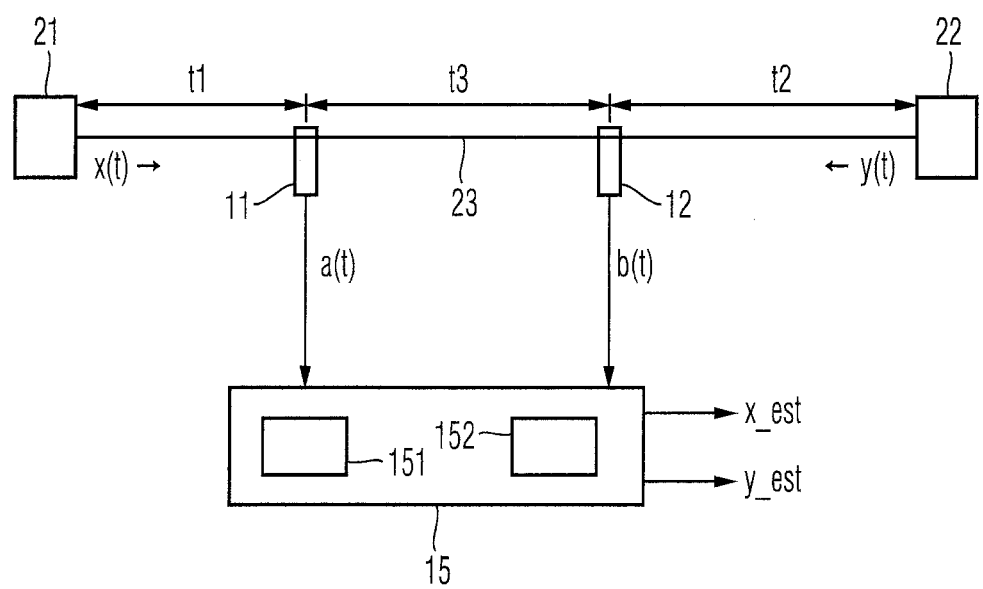
FIG. 2 shows a diagram of an embodiment of a test arrangement according to the present invention.

FIG. 2 shows a diagram of a test arrangement 100 for measuring directed signals on a bidirectional transmission line 23 according to an embodiment. As already described above, a first transceiver 21 may transmit a first signal x(t)

to a second transceiver 22. The second transceiver 22 may receive the first signal x(t). Further, the second transceiver 22 may transmit a second signal y(t) in the direction of the first transceiver 21. Accordingly, the first transceiver 21 may receive the second signal y(t). The first signal x(t) and the second signal y(t) are transmitted by the wired bidirectional transmission line 23.

The first probe 11 is located at a first position on the transmission line 23. The second probe 12 is located at a second position on the transmission line 23. Accordingly, the first signal x(t) requires a propagation time t1 from the first transceiver 21 to the first probe 11. Accordingly, the second signal y(t) requires the same time t1 from the first probe 11 to the first transceiver 21. The first signal x(t) requires a propagation time t2 from the second probe 12 to the second transceiver 22, and the second signal y(t) requires the same propagation time t2 from the second transceiver 22 to the second probe 12. Finally, the first signal x(t) requires a propagation time t3 from the first probe 11 to the second probe 12 and the second signal y(t) requires the same propagation time t3 from the second probe 12 to the first probe 11.

The first probe 11 measures the signals on the transmission line 23 at the first position and provides a first measured signal a(t). The second probe 12 measures the signals on the transmission 23 at the second position and provides a second measured signal b(t). By measuring signals on a wired communication line such as a cable connection, the first measured signal a(t) and the second measured signal b(t) may correspond to the voltages on the communication line 23 at the first position and the second position, respectively.

As already mentioned above, the first probe 11 and the second probe 12 may provide the measured first signal a(t) and the measured second signal b(t) in analogue or digital form to the signal processor 15.

The signal processor 15 may process the obtained first measurement signal a(t) and the second measurement signal b(t) in order to estimate the signal transmitted from the first transceiver 21 in the direction to the second transceiver 22 and/or the signal transmitted from the second transceiver 22 in the direction to the first transceiver 21.

This estimation is based on the following formulas:

Assuming that a first transceiver 21 is sending a first signal x(t) and a second transceiver 22 is sending a second signal y(t), and further assuming that a propagation time from the first transceiver 21 to the first probe 11 is t1 and a propagation time from the second transceiver 22 to the second probe 12 is t2 and a propagation time of a signal from the first probe 11 to the second probe 12 is t3, the first probe 11 may measure a signal a(t) and the second probe 12 may measure a signal b(t) according to the following formulas:

$a(t)=x(t-t1)+y(t-t2-t3)$ $b(t)=x(t-t1-t3)+y(t-t2)$

Accordingly:

$a(t-t3)=x(t-t1-t3)+y(t-t2-2*t3)$ and further:

$b(t)-a(t-t3)=x(t-t1-t3)+y(t-t2)-x(t-t1-t3)-y(t-t2-2*t3)$

This can be simplified to difference d(t) according to the following formula:

$$d(t) = b(t+t2) - a(t-t3+t2)$$

-continued
$$= y(t) - y(t-2*t3)$$

Hence, one signal has been eliminated while creating a differential signal of the other signal. Thus, y can be reconstructed by a reverse differentiation with a simple integration.

For example, the above formula can be transformed to the digital domain as:

$d(k)=y(k)-y(k-2*\Delta 3)$

By converting this to the z-domain:

$Y(z)=D(x)/(1-z^{\wedge}(2*\Delta 3))$

This corresponds to an integrator with an delay element of the length of $2*\Delta 3$.

In the same way, an estimation of the second signal y_est(t) may be computed based on a difference between the second measured signal b(t) and a delayed measured first signal a(t-t3).

In order to obtain the delayed first measurement signal and/or the delayed second measurement signal, the respective measurement data may be recorded in a signal recorder 151. The signal recorder 151 may record the provided first and second measurement data a(t) and b(t) at least for a predetermined period of time. For example, a cyclic memory may be used for recording the respective data.

To perform the processing of the measurement data in order to obtain an estimation of the first signal x_est and the second signal y_est, a digital signal processor (DSP) 152 may be used. However, it is understood, that any other kind of signal processor 152 may be also possible. Signal recorder 151 and digital signal processor 152 may be arranged in a common device 15. However, it is understood, that it is also possible to use separate devices for the signal recorder 151 and the digital signal processor 152, wherein the respective devices are located at different spatial locations and communicatively coupled in order to obtain the respective data.

Figure 3:
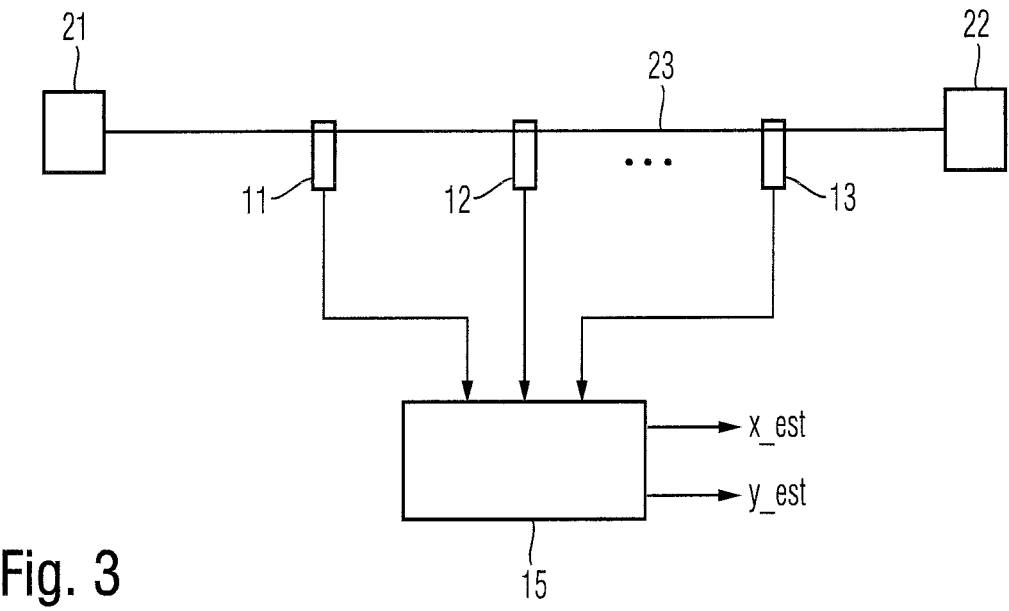
FIG. 3 shows a diagram of another embodiment of a test arrangement according to the present invention.

FIG. 3 shows a block diagram of a further embodiment of a test arrangement 100. The test arrangement 100 in FIG. 3 mainly corresponds to the test arrangement 100 of FIG. 2. The test arrangement 100 according to FIG. 3 comprises at least one further probe 13. Even though only one single further probe 13 is illustrated in FIG. 3, it may be also possible to use any number of further probes 13. By using a number of more than two probes 11, 12, 13, the accuracy of the estimation for the signals x_est and y_est can be increased.

In particular, the estimation of a propagation delay of the signal between the first probe 11 and the second probe 12 can be computed more precisely by considering at least one further measurement signal of a further probe 13. In such a case, a first propagation delay may be computed between the first probe 11 and the further probe 13, and a second propagation delay may be computed between the second probe 12 and the further probe 13. For example, the first and the second propagation delay may be computed by using a cross correlation. By subtracting the first propagation delay from the second propagation delay, a propagation delay between the first probe and the second probe can be determined. In this way, the accuracy of the propagation delay between the first and the second probe can be increased.

For sake of clarity in the following description of the method based on FIG. 4, reference signs used above in the description of the apparatus based on FIG. 1-3 will be maintained.

Figure 4:
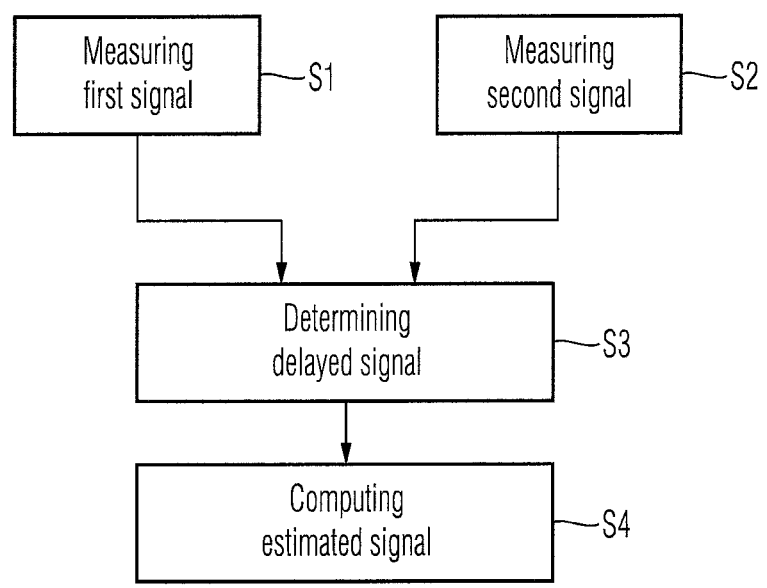
FIG. 4 shows a flow diagram of an embodiment of a test method according to the present invention.

FIG. 4 shows a flow chart of a method for measuring a directed signal on a bidirectional transmission line. The method comprises a step S1 of measuring a first measurement signal a(t) at a first position on the transmission line 23. In a step S2 a second measurement signal b(t) is measured at a second position on the transmission line 23. In a step S3 a delayed second measurement signal b(t−t3) is determined based a distance between the first position and the second position on the transmission line. In step S4, a forward directed signal on the transmission line 23 is computed using the difference between the first measurement signal a(t) and the delayed second measurement signal b(t−t3).

The computing step S4 for computing the forward directed signal on the transmission line 23 may comprise calculating a difference between the first measurement signal a(t) and the delayed second measurement signal b(t−t3), and a step of applying a reconstruction filtering of the computed difference. The reconstruction filtering may be based, for instance, on the above-mentioned formulas for determining the estimated signals.

The method may further comprise the steps of determining a delayed first measurement signal based on the distance between the first position and the second position on the transmission line 23 and a step of computing a backward directed signal on the transmission line 23 using the second measurement signal b(t) and the delayed first measurement signal a(t−t3).

The delayed first measurement signal a(t−t3) and/or the delayed second measurement signal b(t−t3) are determined using a propagation delay of the signal between the first position of the first probe 11 and the second position of the second probe 12 on the transmission line 23.

The propagation delay between the first probe 11 and second probe 12 may be determined using a cross correlation between the first measurement signal a(t) and the second measurement signal b(t).

The method may further comprise the steps of measuring a third measurement signal at a third position on the transmission line 23 and a step of determining a first propagation delay of a signal on the transmission line 23 between the first position and the third position of the transmission line. The method may further comprise a step of determining a second propagation delay of the signal on the transmission line 23 between the second position and the third position of the transmission line 23. Finally, the method may comprise a step of computing the propagation delay of the signal between the first position and the second position of the transmission line 23 using the difference between the determined first propagation delay and the determined second propagation delay.

Summarizing, the present invention relates to an estimation of a directed signal on a bidirectional duplex transmission line without the need of a directional coupler which has to be physically inserted into the wired transmission line. It is for this purpose, that the signals on the transmission line are measured at two separate spatial positions and the directed signals on the wired transmission line are estimated by analyzing the measured signals.

Although the present invention has been described in the above by way of preferred embodiments, it is not limited thereto, but rather can be modified in a wide range of ways. In particular, the invention can be changed or modified in various ways without deviating from the core of the invention.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon re-viewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not in-tended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

What I claim is:

1. A device for measuring a directed signal on a bidirectional transmission line, the device comprising:
    a first probe adapted to measure a first measurement signal at a first position on the transmission line;
    a second probe adapted to measure a second measurement signal at a second position on the transmission line; and
    a signal processor adapted to determine a delayed second measurement signal based on a distance between the first position and the second position on the transmission line, and to compute a forward directed signal on the transmission line using a difference between the first measurement signal and the delayed second measurement signal,
    wherein a spatial distance between the first position and the second position on the transmission line is set up based on at least one of the frequency or the bandwidth of the signals transmitted on the transmission line.

2. The device of claim 1, wherein the signal processor is adapted to delay the first measurement signal based on the distance between the first position and the second position on the transmission line, and to compute a backward directed signal on the transmission line using a difference between the second measurement signal and the delayed first measurement signal.

3. The device of claim 1, wherein the signal processor is adapted to determine a time period for delaying the second measurement signal based on the spatial distance between the first position and the second position on the transmission line.

4. The device of claim 1, wherein the signal processor is adapted to compute a propagation delay of a signal between the first position and the second position on the transmission line, wherein at least one of a time period for delaying the first measurement signal or the second measurement signal is determined based on the computed propagation delay.

5. The device of claim 1, wherein the spatial distance between the first position and the second position on the transmission line is set to achieve a sampling corresponding to at least the reciprocal value of 10 times of the maximum frequency of the signal transmitted on the transmission line.

6. The device of claim 1, comprising a number of further probes, each further probe being adapted to measure a further measurement signal at a respective further position on the transmission line.

7. The device of claim 6, wherein the signal processor is adapted to determine at least one of the forward directed signal or the backward directed signal on the transmission line using the first measurement signal, the second measurement signal and the further measurement signals.

8. The device of claim 1, comprising a signal recorder adapted to record the measured first signal and the measured second signal using a predetermined sampling rate.

9. A test arrangement, comprising:
a first transceiver adapted to transmit a first signal and to receive a second signal;
a second transceiver adapted to transmit the second signal and to receive the first signal;
a wired bidirectional transmission line adapted to communicatively couple the first transceiver and the second transceiver; and
a device for measuring a directed signal on a bidirectional transmission line, the device comprising:
a first probe adapted to measure a first measurement signal at a first position on the transmission line;
a second probe adapted to measure a second measurement signal at a second position on the transmission line; and
a signal processor adapted to determine a delayed second measurement signal based on a distance between the first position and the second position on the transmission line, and to compute a forward directed signal on the transmission line using a difference between the first measurement signal and the delayed second measurement signal wherein a spatial distance between the first position and the second position on the transmission line is set up based on at least one of the frequency or the bandwidth of the signals transmitted on the transmission line.

10. A method for measuring a directed signal on a bidirectional transmission line, the method comprising the steps of:
measuring a first measurement signal at a first position on the transmission line;
measuring a second measurement signal at a second position on the transmission line; and
determining a delayed second measurement signal based on a distance between the first position and the second position on the transmission line; and
computing a forward directed signal on the transmission line using a difference between the first measurement signal and the delayed second measurement signal,
wherein a spatial distance between the first position and the second position on the transmission line is set up based on at least one of the frequency or the bandwidth of the signals transmitted on the transmission line.

11. The method of claim 10, wherein computing the forward directed signal on the transmission line comprising calculating a difference between the first measurement signal and the delayed second measurement signal, and applying a reconstruction filtering to the computed difference.

12. The method of claim 10, further comprising the steps of:
determining a delayed first measurement signal based on the distance between the first position and the second position on the transmission line; and
computing a backward directed signal on the transmission line using a difference between the second measurement signal and the delayed first measurement signal.

13. The method of claim 10, wherein at least one of the delayed first measurement signal or the delayed second measurement signal are determined using a propagation delay of a signal between the first position and the second position on the transmission line.

14. The method of claim 13, wherein the propagation delay is determined using a cross correlation between the first measurement signal and the second measurement signal.

15. The method of claim 13, further comprising the steps of:
measuring a third measurement signal at a third position on the transmission line;
determining a first propagation delay of a signal on the transmission line between the first position and the third position on the transmission line;
determining a second propagation delay of the signal on the transmission line between the second position and the third position on the transmission line; and
computing propagation delay of a signal between the first position and the second position on the transmission line using the difference between the determined first propagation delay and the determined second propagation delay.

* * * * *